US005298926A

United States Patent [19]

Fukushima et al.

[11] Patent Number: 5,298,926

[45] Date of Patent: Mar. 29, 1994

[54] INK JET RECORDING APPARATUS AND METHOD FOR CAPTURING SATELLITE INK DROPLETS AND INK MIST

[75] Inventors: Hisashi Fukushima, Yokohama; Yasushi Miura, Kawasaki; Nobuhiko Takekoshi, Yokohama, all of Japan

[73] Assignee: Canon Kabushiki Kaisha, Tokyo, Japan

[21] Appl. No.: 752,278

[22] Filed: Aug. 28, 1991

[30] Foreign Application Priority Data

Aug. 31, 1990 [JP] Japan .................................. 2-227930

[51] Int. Cl.$^5$ .............................................. G01D 15/16

[52] U.S. Cl. .................................... 346/140 R; 346/75

[58] Field of Search .............................. 346/75, 140 R

[56] References Cited

U.S. PATENT DOCUMENTS 4,016,571 4/1977 Yamada .................................. 346/75
4,175,266 11/1979 Nakano et al. .......................... 346/75
4,313,124 1/1982 Hara ................................ 346/140 R
4,345,262 8/1982 Shirato et al. .................. 346/140 R
4,459,600 7/1984 Sato et al. ....................... 346/140 R
4,463,359 7/1984 Ayata et al. ......................... 346/1.1
4,514,735 4/1985 Jones .................................. 346/75 X
4,558,333 12/1985 Sugitani et al. ................. 346/140 R
4,723,129 2/1988 Endo et al. ........................... 346/1.1
4,740,796 4/1988 Endo et al. ........................... 346/1.1
5,163,177 11/1992 Komura .......................... 346/140 R

*Primary Examiner*—A. T. Grimley
*Assistant Examiner*—Sandra L. Brasé
*Attorney, Agent, or Firm*—Fitzpatrick, Cella, Harper & Scinto

[57] ABSTRACT

An ink jet recording apparatus for performing recording by discharging ink onto a recording medium from a discharging port provided for a recording head comprises a first electrode and a second electrode arranged for attracting unwanted ink discharged from the discharging port, and a power source for applying voltages of opposite polarities to each other to the first electrode and second electrode. This makes it possible to efficiently remove unwanted droplets which are generated at the time of recording, so that more stable and reliable recording can be performed.

18 Claims, 11 Drawing Sheets

INK JET RECORDING APPARATUS AND METHOD FOR CAPTURING SATELLITE INK DROPLETS AND INK MIST

BACKGROUND OF THE INVENTION

1. Field of the Invention

The present invention relates to an ink jet recording apparatus for recording by discharging ink onto a recording medium.

2. Related Background Art

FIGS. 9A through 9C are views illustrating the respective states of recording by a conventional ink jet recording apparatus. As shown in FIGS. 9A through 9C, a conveyer belt 205 for conveying a recording medium 204 and a recording head 201 for discharging ink onto the aforesaid recording medium 204 are positioned to face each other. Also, in the recording head 201, there is provided a pressure generating means 202 which is means for generating the discharging energy.

Subsequently, the recording by the ink jet recording method shown in FIGS. 9A through 9C will be described.

At first, as shown in FIG. 9A, ink 203 in the recording head 201 is forced out by the pressure of the pressure generating means 202 and a first ink droplet 206-1 is discharged. Next, as shown in FIG. 9B, the first ink droplet 206-1 impacts on and spreads over the recording medium 204 which is attracted to the electrostatic conveyer belt 205 by the electrostatic attraction of the belt 205 to whatever is being conveyed on the belt 205. Then a second ink droplet 206-2 is discharged from the recording head 201. At this juncture, unwanted droplets 207 are generated between the recording head 201 and recording medium 204. The aforesaid unwanted droplets 207 are those generated accompanying the discharging of the ink droplet 206-1, 206-2, and so on (satellite ink droplets) and a part of those ink droplets 206-1, 206-2 bounces or rebounds, and so on (rebounding mist ink) and others. Then, as shown in FIG. 9C, the second ink droplet 206-2 is impacted with a part thereof being overlapped with the first ink droplet 206-1. Also, as a third ink droplet 206-3 is discharged, the number of unwanted droplets 207 increase. In a high-density recording which is performed by continuous discharging, many unwanted droplets 207 are generated. Particularly, in a full-line recording using the full-line head provided with a plurality of discharging ports over the entire recording area, or in a color recording, the generation of the unwanted droplets 207 is conspicuous.

In the aforesaid conventional example, there is no particular counter measure is taken for eliminating the unwanted ink thus generated, leading to the occasional accumulation of unwanted ink adhering to the vicinity of the discharging port of the recording head. Many of the unwanted droplets are charged with electricity and tend to be attached to the vicinity of the discharging port of the recording head 201. When the unwanted droplets thus adhere to the discharging surface 209 in the vicinity of the discharging port 208 of the recording head, normal ink discharging subsequent thereto is hindered, and there is a possibility that a defective discharge such as disabled ink discharging takes place, leading to the resultant inability of the device to perform the recording in a desirable condition.

SUMMARY OF THE INVENTION

An object of the present invention is to provide an ink jet recording apparatus capable of efficiently removing the ink mist and other unwanted droplets which are generated at the time of recording, though not directly participated in the recording.

Another object of the present invention is to provide an ink jet recording apparatus capable of maintaining the performance of desirable recordings for a long time by reducing the frequency of discharging ports to occur.

Still another object of the present invention is to provide an ink jet recording apparatus capable of preventing unwanted droplets from adhering to the vicinity of the discharging port of the recording head so that disabled discharging does not result.

A further object of the present invention is to provide an ink jet recording apparatus constructed such that the ink mist and other unwanted droplets are caught by electrodes for collection so as to optimize the prevention of the unwanted droplets adhering to the recording medium.

One of the specific objects of the present invention is to provide an ink jet recording apparatus provided with at least each one of first and second electrodes arranged in the vicinity of a gap between the recording head and, recording medium, and a power source for applying respectively to these first and second electrodes oppositely polarized voltage.

DETAILED DESCRIPTION OF THE PREFERRED EMBODIMENTS

Now, the embodiment set forth below is an ink jet recording apparatus provided with at least each one of first and second electrodes arranged in the vicinity of a gap between the recording head and recording medium, and a power source for applying to these first and second electrodes the voltages of having opposite polarities. Also, the present embodiment of the ink jet recording apparatus is provided with a conveying means for conveying a recording medium, which is held onto a conveyer belt by static electricity, to a position facing the recording head. In this respect, the recording head according to the present embodiment is a full-line type recording head which is provided with a plurality of discharging ports over the entire recording area of the recording medium and further, in the present embodiment, the recording apparatus is provided with four full-line recording heads to enable full color recording. Also, the recording head according to the present embodiment is provided with an electrothermal converter as means for generating thermal energy to enable the recording head to discharge ink utilizing the thermal energy thus generated.

Now, as described earlier, when an ink droplet is discharged from the recording head toward the recording medium, the ink droplet is split into the major droplet and satellite ink droplet, and further, when the major droplet impacts on the recording medium, a part thereof bounces to become the ink mist. The satellite ink, ink mist and other unwanted droplets are usually charged with either positive or negative electricity, and are attracted by either one of the first and second electrodes which opposite polarities, as described earlier (by an electrode having opposite polarity to that of an unwanted droplet) for collection. Therefore, the unwanted droplets are prevented from becoming attached to the discharging surface in the vicinity of the discharging port of the recording head.

Now, subsequently, the specific description of the embodiment suited for the present invention will be made in conjunction with the accompanying drawings.

A first embodiment will be described.

Figure 1:
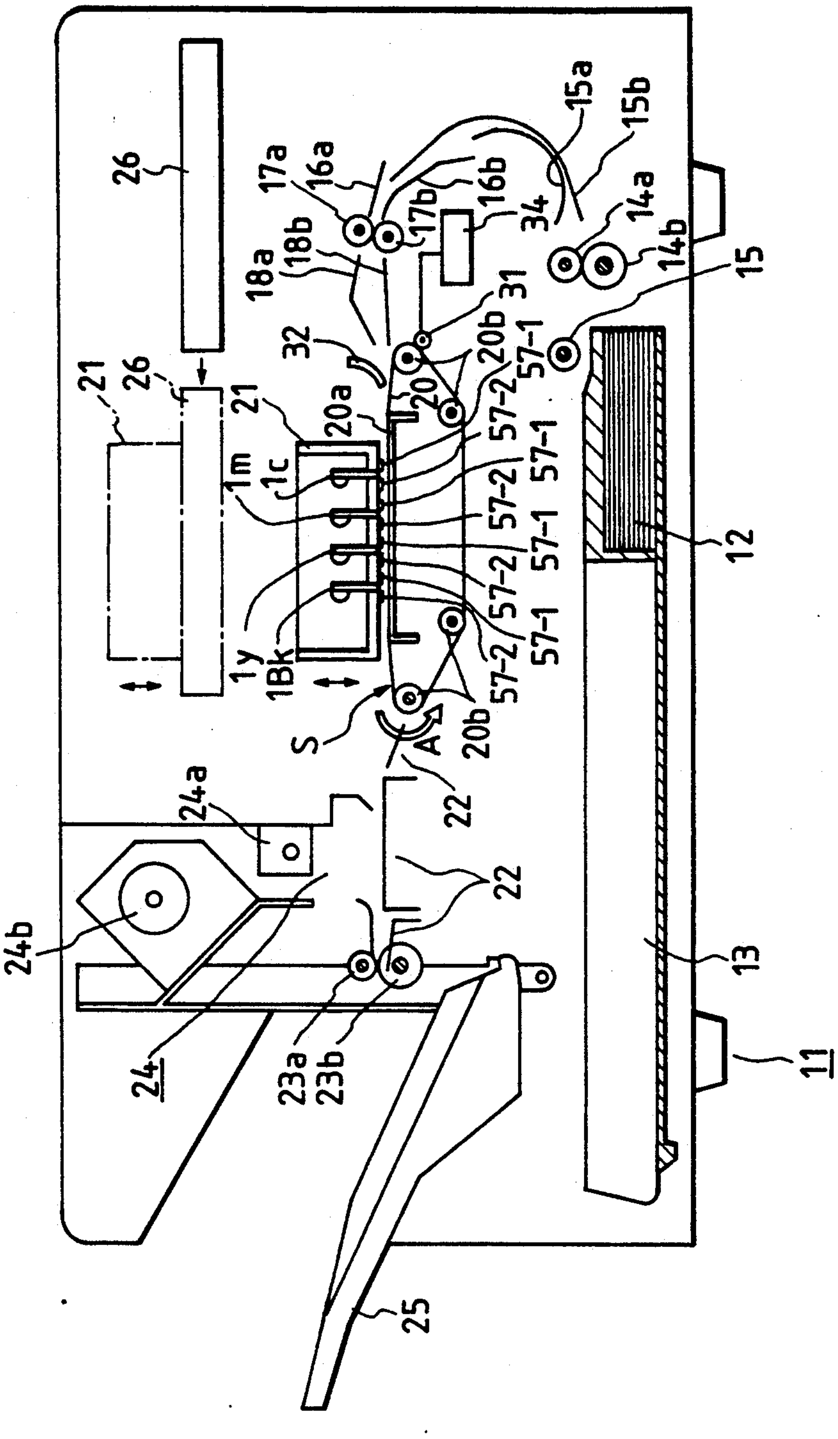
FIG. 1 is a view schematically showing the structure of an example of the ink jet recording apparatus to which the present invention is applicable.

In FIG. 1, on the bottom of the ink jet recording apparatus 11, there is provided a detachable paper supply cassette 13 for storing, recording papers 12, which is a recording medium, cut into sheets of a predetermined size.

On the right-hand side of the aforesaid paper supply cassette 13 in FIG. 1, a pair of the carrier rollers 14*a* and 14*b*, at least one of which is forcibly rotated, are rotatively supported respectively. Then, accompanying the rotation of the aforesaid pair of carrier rollers 14*a* and 14*b*, a recording sheet 12, which is pushed forward by a pickup roller 15 one by one from the paper supply cassette 13, is pinched by the carrier rollers to be conveyed. Then, this recording sheet 12 is guided sequentially between two curbing guide plates 15*a* and 15*b* and two guide plates 16*a* and 16*b* provided before the resisting rollers to a pair of the resisting rollers 17*a* and 17*b*.

The aforesaid pair of the resisting rollers 17*a* and 17*b* are rotatively supported and at least one of them is forcibly rotated at a predetermined rotational velocity. Then, accompanying its rotation, the aforesaid recording sheet 12 pinched therebetween is conveyed forward sequentially between the guide plates 18*a* and 18*b* provided after the resisting rollers and an auxiliary belt 19 to be fed onto a charged attraction belt 20.

The aforesaid charged attraction belt 20 is tensioned around four roller 20*b* each rotatively supported, and at least one of the rollers is forcibly rotated at a predetermined rotational velocity to allow the belt to rotate in the direction indicated by arrow A in FIG. 1. (In this respect, in the figures other than FIG. 1, although only two rollers 20*b* are illustrated, the rollers 20*b* can be provided in any numbers which may serve the same purpose.)

Further, directly beneath the upper traveling path of the aforesaid charged attraction belt 20 in FIG. 1, a back platen 20*a* is arranged to enable the charged attraction belt 20 running on the aforesaid back platen 20*a* to form its flat surface. In this way, the space between the recording sheet 12 and the recording head, which will be described later, is maintained to obtain an improved quality of recording.

Also, the aforesaid charged attraction belt 20 is charged by a charging roller 31 which is in contact with the charged attraction belt 20 to apply a voltage thereto, and the aforesaid recording sheet 12 is attracted thereby with the static electricity thus provided. Then, by the rotation of the belt 20 in the direction indicated by arrow A in FIG. 1, the recording sheet 12 is conveyed to the location below the four recording heads 1BK, 1*y*, 1*m*, and 1*c*.

Further, an electrode 32 is arranged to be in contact with the surface of the charged attraction belt 20 to inject an electric charge to the recording sheet 12 attracted to the foresaid belt 20.

Now, the aforesaid four recording heads respectively arranged for four different colors, 1BK (black), 1*y* (yellow), 1*m* (magenta), and 1*c* (cyan), are the full-line type having 4,736 discharging ports with a density of 400 dpi (400 pixels per inch) for each to cover the entire recording area of a recording medium, and, installed with equal intervals in a recording head unit 21 mounted on a known conveying means (not shown).

Here, an example of the aforesaid recording heads 1BK, 1*y*, 1*m*, and 1*c* will be described.

Figure 2:
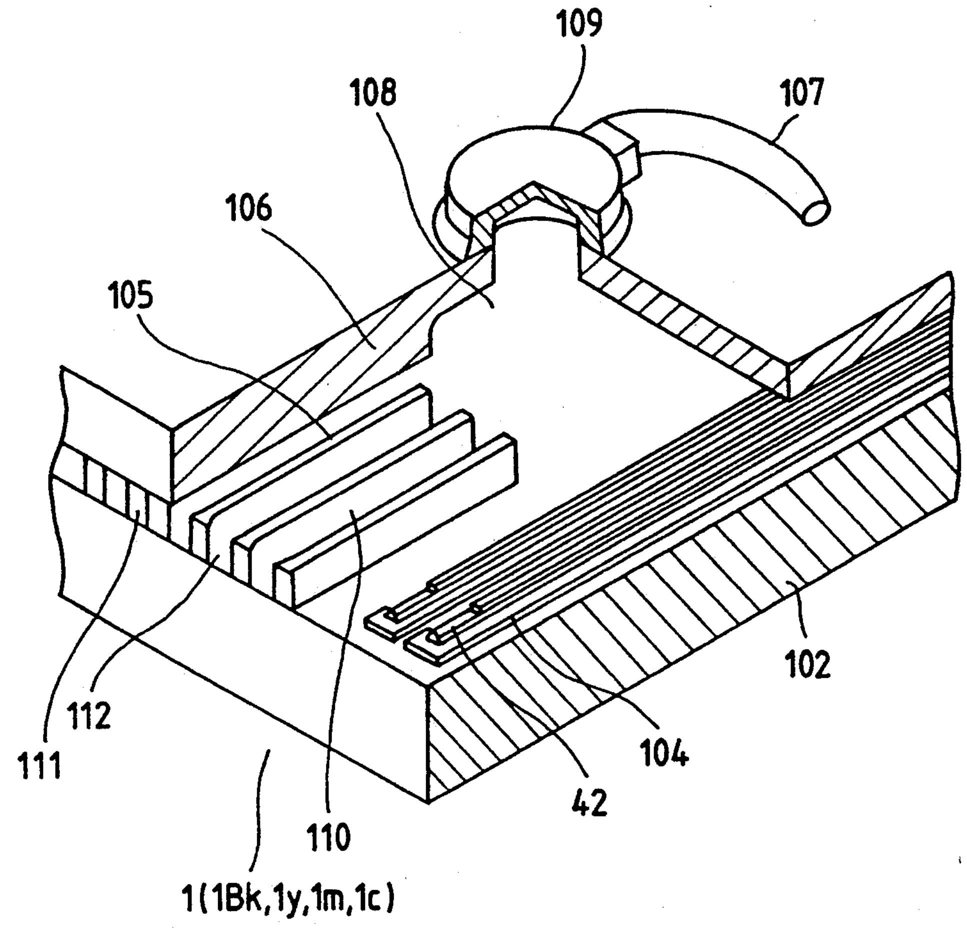
FIG. 2 is a view schematically showing the structure of an example of the recording head to which the present invention is applicable.

In FIG. 2, the recording head 1 is an arbitrary one of the four recording heads 1BK, 1*y*, 1*m*, and 1*c*.

This recording head 1 (1BK, 1*y*, 1*m*, and 1*c*) has a plurality of electrothermal converters 42, a plurality of electrodes 104, a plurality of nozzle walls 105, and a ceiling plate 106 film processed on a substrate 102 through etching, deposition, sputtering and other semiconductor fabrication processes.

The recording ink is supplied to a common liquid chamber 108 installed behind each of the nozzles 110 on the substrate 102 from a supply tank (not shown) through a supply tube 107 and connector 109 for the supply tube. The ink supplied to the inside of the aforesaid common liquid chamber 108 is supplied to each of the nozzles 110 by capillary action and held stability by meniscuses formed for each of them at the discharging port surface 111 where the discharging port 112 is formed at the leading end of each nozzle. Then, when the electrothermal converter 42 is energized at this juncture by the electrode 104, the ink in the vicinity of the aforesaid electrothermal converter 42 is heated, and foaming phenomenon is produced. Hence, by the energy of the aforesaid foaming, a droplet is discharged from the discharging port 112.

The respective discharging port 112 of each of the aforesaid recording heads 112, 1BK, 1*y*, 1*m*, and 1*c* (refer to FIG. 1) are positioned apart from the charged attraction belt 20 with a predetermined space therebetween at the time of recording. Also, at the time of non-recording, the recording heads are elevated with the recording head unit 21 by the aforesaid conveying means to a position indicated by a dashed line above the charged attraction belt 20 in FIG. 1, and the structure is arranged s that the recording head unit is closed airtight by the capping unit 26 which has also been moved interrelatedly.

In the aforesaid capping unit 26, means provided for collecting the waste ink discharged from each of the recording heads 1BK, 1*y*, 1*m*, and 1*c* and guiding such ink to a waste ink tank (not shown) when the head recovering operation is performed at the time of airtight closing described above.

Now, on the left-hand side of the aforesaid charged attraction belt 20 in FIG., 1, a plurality of guide plates 22 and a pair of discharge rollers 23a and 23b are sequentially, arranged in series. Then, the recorded recording sheet 12 is exhausted to a tray 25 after passing through the charged attraction belt 20 and a fixing and exhausting portion 24 while, if required, gas is being blown from a heated fan 24b by a heater 24a.

Next, the description will be made of the present embodiment when, the recording is performed.

The recording sheet 12 forcibly pushed forward by the pick-up roller 15 from the paper supply cassette 13 is conveyed to the pair of resisting rollers 17a and 17b through the pair of feeding rollers 14a and 14b. Then, the recording sheet stops for several ms in such a state that the leading end thereof is in contact with the portion where the peripheries of the pair of resisting rollers 17a and 17b contact with each other and a loop has been formed. After that, the recording sheet is carried forward to the charged attraction belt 20 by a predetermined timing and is drawn by the electrostatic attraction to the charged attraction belt 20 which rotates at a predetermined rotational velocity. Thus, the recording sheet passes sequentially beneath the discharging port 112 of each recording head, 1BK, 1y, 1m, 1c. At this juncture, each of the aforesaid recording heads 1BK, 1y, 1m, and 1c is caused to discharge ink from the respective discharging port 112 of each of the recording head, 1BK, 1y, 1m, and 1c, to record on the recording sheet 12 by matching its discharging with the timing measured from the aforesaid timing of the sheet feeding. The aforesaid recording sheet 12 on which the recording has been performed is discharged to the tray 25 after passing through the fixing and discharging portion 24 for fixing and drying.

Now, the description will be made of the conveyance, the discharge, and the collection of unwanted ink in the first embodiment of the present invention.

Figure 3A:
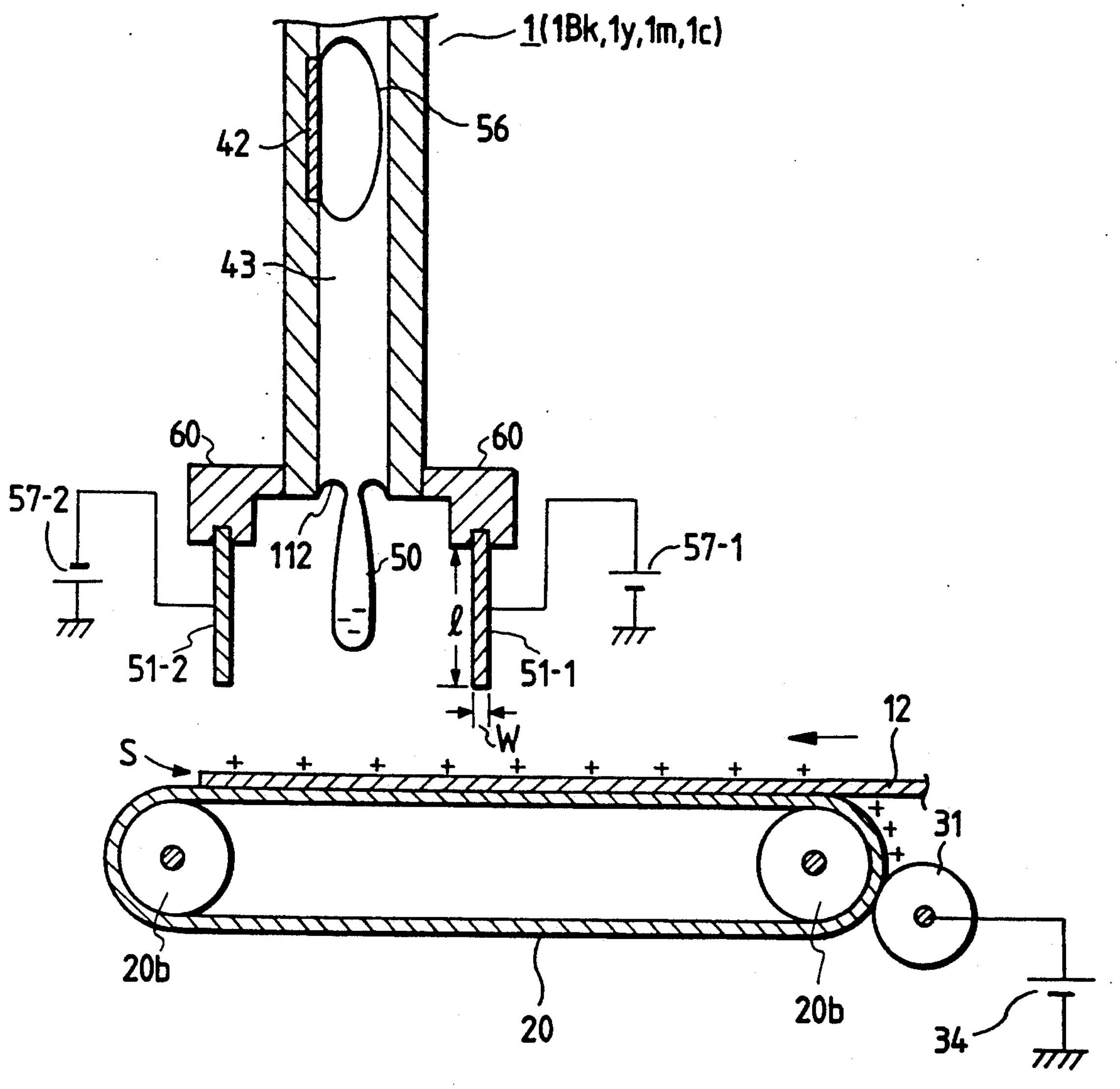
FIG. 3A through 3D are views illustrating a first embodiment of the present invention.
Figure 3B:
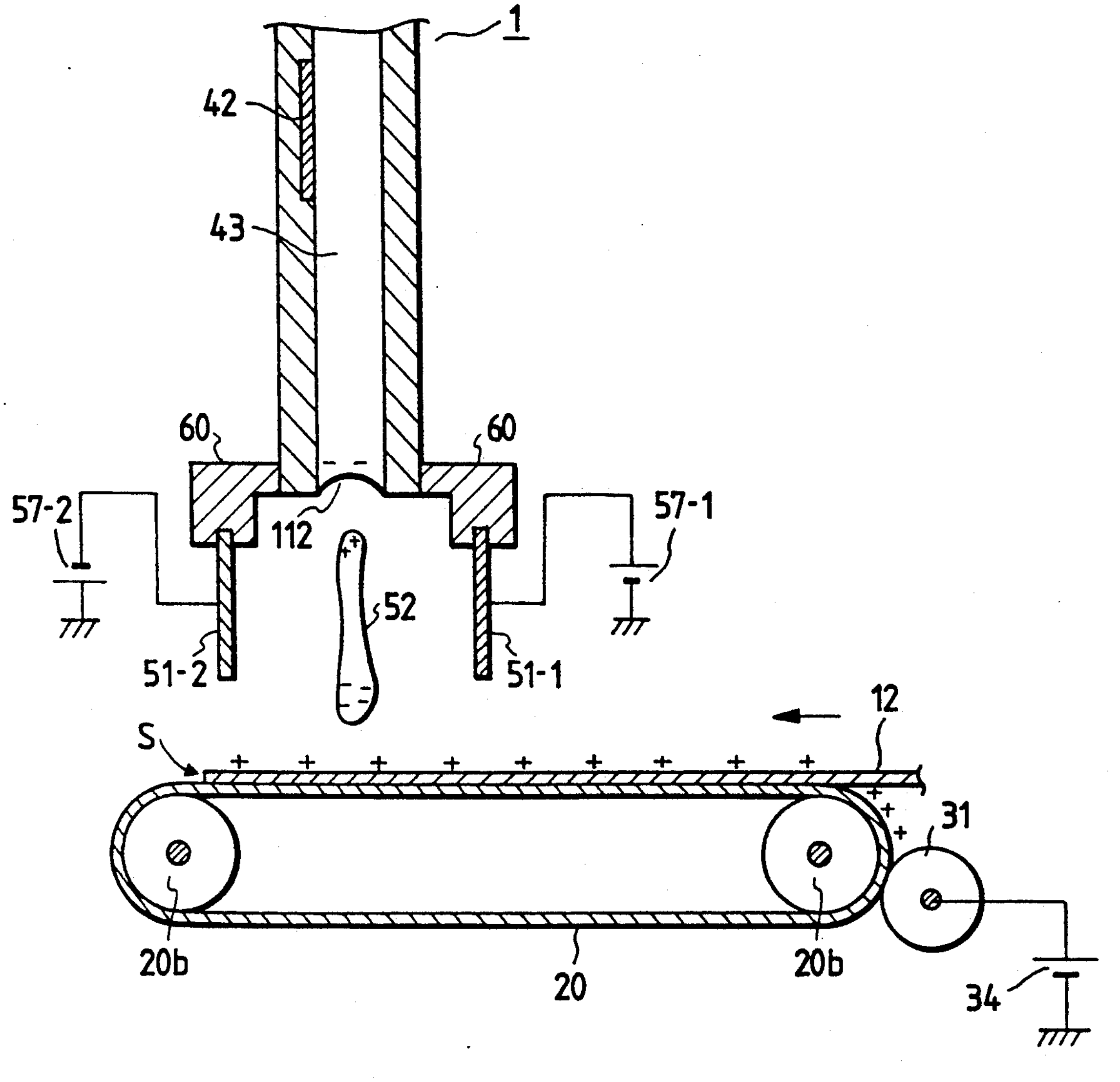

FIG. 3A is a view illustrating the timing immediately before the formation of a droplet to be discharged. As shown in FIG. 3A, the charged roller 31 is made of conductive rubber, to which a voltage of approximately +2 kv is applied (by a high-voltage power source 34), is caused to contact the charged attraction belt 20 to provide the belt, 20 with, a positive charge. Then, the recording sheet 12 is held tightly in contact with the charged attraction belt 20. Hence, on the side of the recording sheet 12 to the charged attraction belt 20, a negative charge is induced, and the attractive force is generated between the recording sheet 12 and the charged attraction belt 20. On the other side of the recording sheet 12 to the charged attraction belt 20 (the side facing the recording head 1 (1BK, 1y, 1m, and 1c), a positive charge is induced, and a potential difference is generated between the recording head 1 (1BK, 1y, 1m, and 1c) and the recording sheet 12 to produce an electric field. Subsequently, on a liquid column 50 produced by the bubble 56 formed by energizing the electrothermal converter 42 provided in the recording head (1BK, 1y, 1m, and 1c), a negative charge, which is opposite to the positive charge on the recording sheet 12, is induced. Then, by the effect of the aforesaid electric field, a droplet 52 is polarized as shown in FIG. 3B which represents a phenomenon appearing with a timing for the droplet 52 to fly in the air.

Figure 3C:
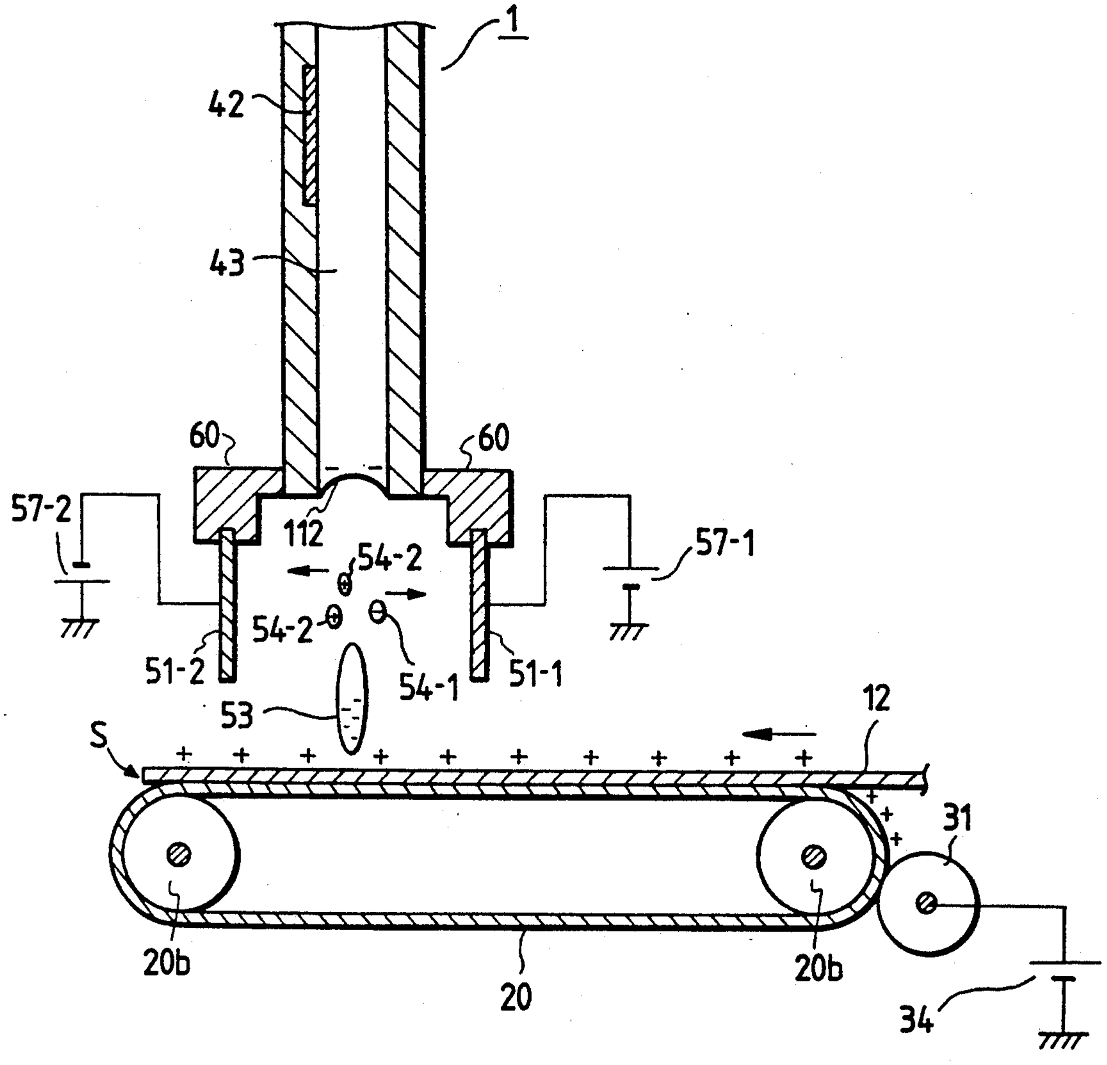
Figure 3D:
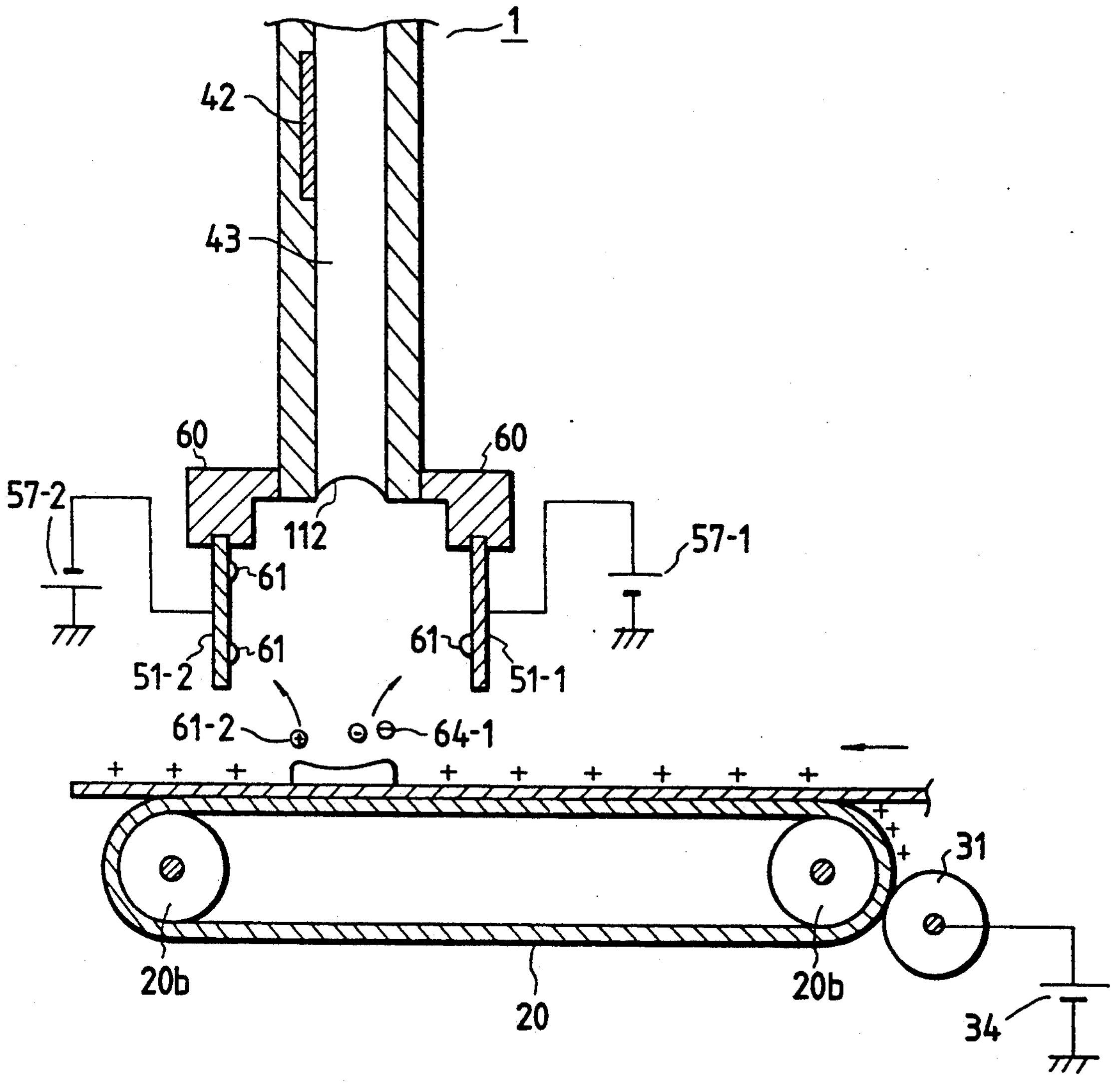

FIG. 3C illustates the phenomenon appearing in the subsequent timing. As shown in FIG. 3C, the droplet is separated into the main droplet 53 and satellite ink droplet 54-1, both charged with negative charges, and satellite ink droplet 54-2 charged with a positive charge. The negatively charged satellite ink droplet 54-1 is attracted to a positive electrode 51-1, and the positively charged satellite ink droplet 54-2 is attracted to a negative electrode 51-2 respectively to adhere to the respective surface of the electrodes. The kinetic energy of the main droplet 53 is great; thus the main droplet is not caught by, the aforesaid electrodes 51-1 and 51-2 for collection but rather, is impacted on the recording paper 12. As shown in FIG. 3D, there is formed the rebounding mist ink 64-1 which is charged with the negative charge of the main droplet 53 and the rebounding mist ink 64-2 charged with the positive charge on the surface of the recording sheet 12 among those mist ink elements which have bounced after the impact of the main droplet. Then, the negatively charged rebounding mist ink 64-1 is attracted to the positive electrode 51-1, and the positively charged rebounding mist ink 64-2 is attracted to the negative electrode 51-2 respectively .

Here, the positive electrode 51-1 and negative electrode 51-2 are arranged along the plural discharging ports 112 juxtaposed over the entire recording area. These electrodes also cover the entire recording area. Also, these electrodes 51-1 and 51-2 are elongated thin plate type, and mounted in the recording head unit 21 (FIG. 1) longitudinally. (In FIG. 1, these are represented schematically). More specifically, the electrodes are mounted in the vicinity of the discharging port 112 through a electrode support 60, and are positioned between the discharging port 112 and the conveying path S of the recording sheet 12. In the present embodiment, one sheet each of plate type electrodes 51-1 and 51 2 is arranged to cover the entire width of the recording area, but the arrangement is not necessarily made to over the entire width thereof. For example, a plurality of electrodes may be arranged at appropriate intervals instead.

Also, the unwanted ink 61 adhering to the surface of the electrodes 51-1 and 51-2 may be left for natural drying or removed at the time of the head cleaning In this respect, FIGS. 3A through 3D are enlarged views, and usually, the space between the discharging port 112 and the recording sheet 12 is approximately 300 μ to 1 mm. Therefore, the longitudinal length 1 of the electrodes 51-1 and 51-2 is approximately 0.1–0.3 mm, and width W, approximately 0.1 mm. Accordingly, these electrodes do not present any problem at the time of head cleaning or head capping. Particularly, if the head discharging surface 111 and the lower ends of the electrodes 51-1 and 51-2 are provided on the same plane as described later in conjunction with FIG. 6, the head cleaning and head capping can be performed more efficiently.

In this respect, the voltage applied to each electrode is roughly several hundred volts, although the optimum value varies in accordance with the positional relationship between each electrode, discharging port, and recording medium, the charge intensity of unwanted droplets, the amount of the kinetic energy of unwanted droplets, and others.

Also, the charge polarity of the belt 20 for the electrostatic attraction conveyance is not necessarily positive but the polarity may be made negative.

Further, in the aforesaid first embodiment, the arrangement is made so that the voltage is applied to each of the electrodes continuously, but the present invention is not limited to such arrangement. There is a case where the voltage application should desirably be arranged with a means for setting a voltage application timing for the timing given below, for example.

Figure 4:
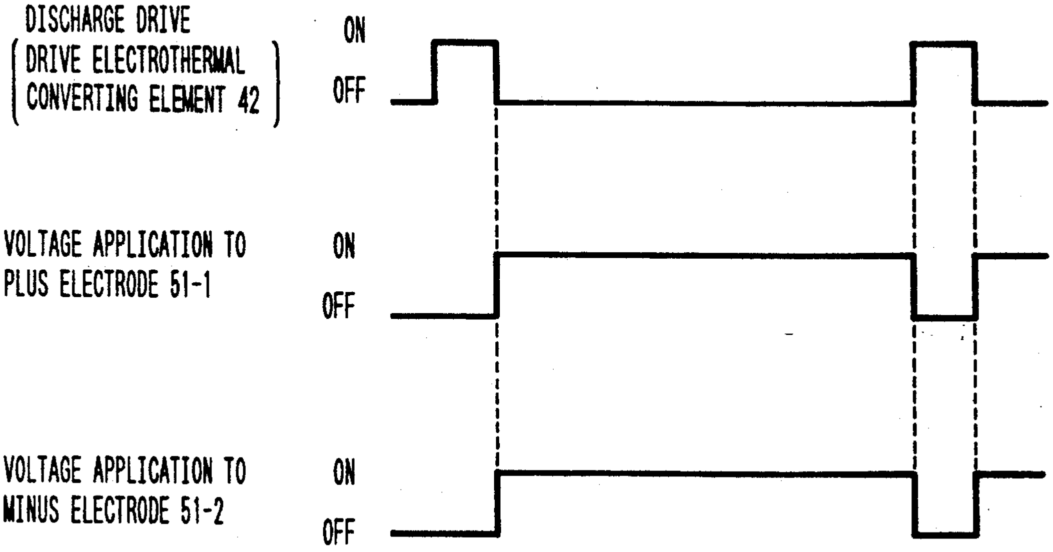
FIG. 4 is a timing chart illustrating a second embodiment of the present invention.

In other words, as shown in FIG. 4, a voltage is applied respectively to the positive electrode 51-1 and negative electrode 51-2 subsequent to the completion of the separation of the main droplet 53 and satellite droplets 54-1 and 54-2 after the discharge driving (the thermal driving of the electrothermal converter 42) has been terminated. In this way, it is possible to attract an aimed satellite droplet to the electrode 51-1 or 51-2 electrically without affecting the charge carried by the droplet, negative or positive, at the time of the drop separation. Also, it is possible to reduce the effect which is produced on the motion of the main droplet 53.

Figure 5:
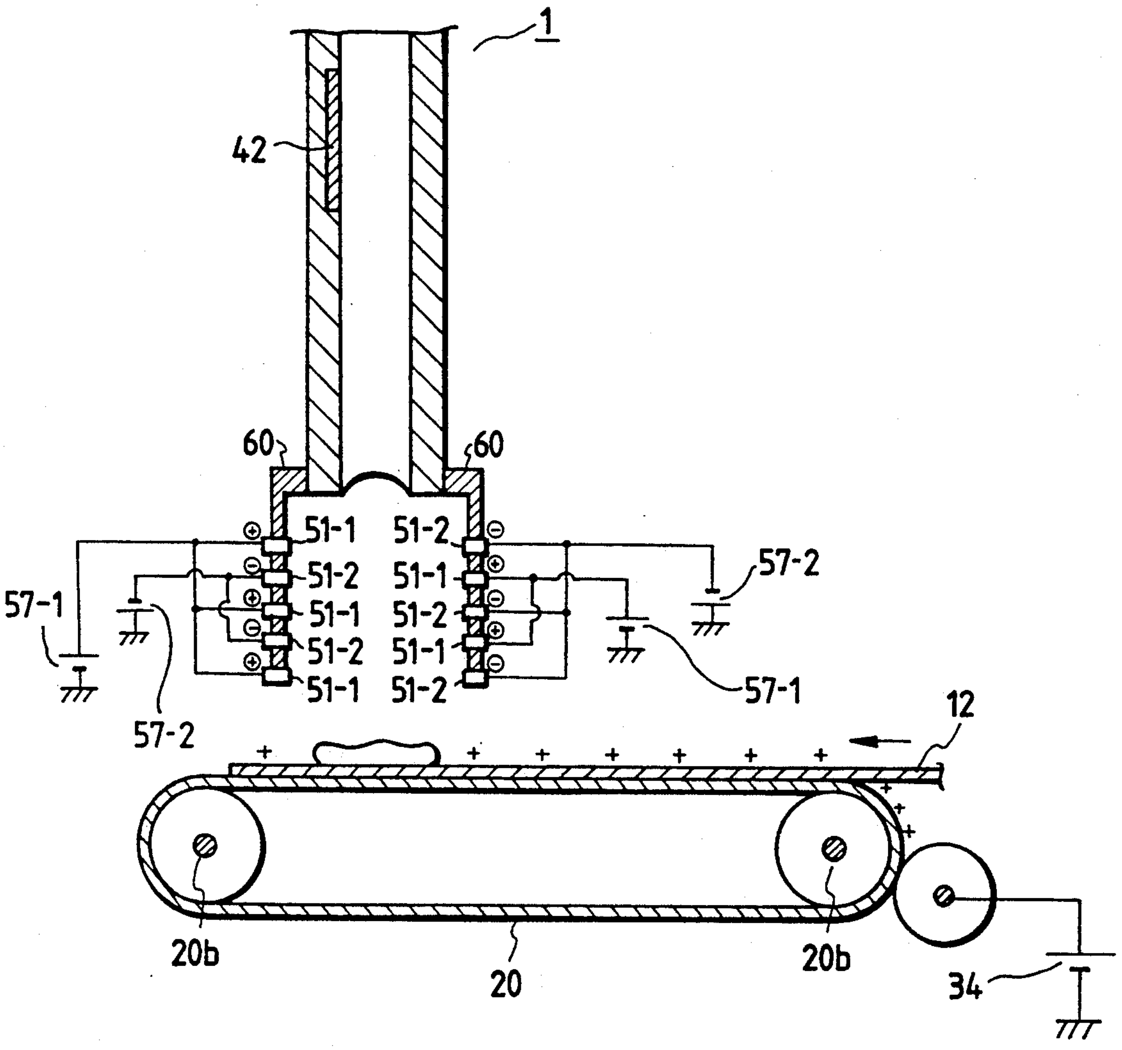
FIG. 5 is a view illustrating a third embodiment of the present invention.

Also, in the first embodiment set forth above, there is presented an example in which each one of the positive and negative electrodes is arranged along the discharging port column to cover the entire width of the recording area, but the present invention is not limited thereto. For example, as shown in FIG. 5, a plurality of positive electrodes 51-1 and negative electrodes 51-2 are provided respectively to make the attraction of unwanted droplets more reliable.

Figure 6:
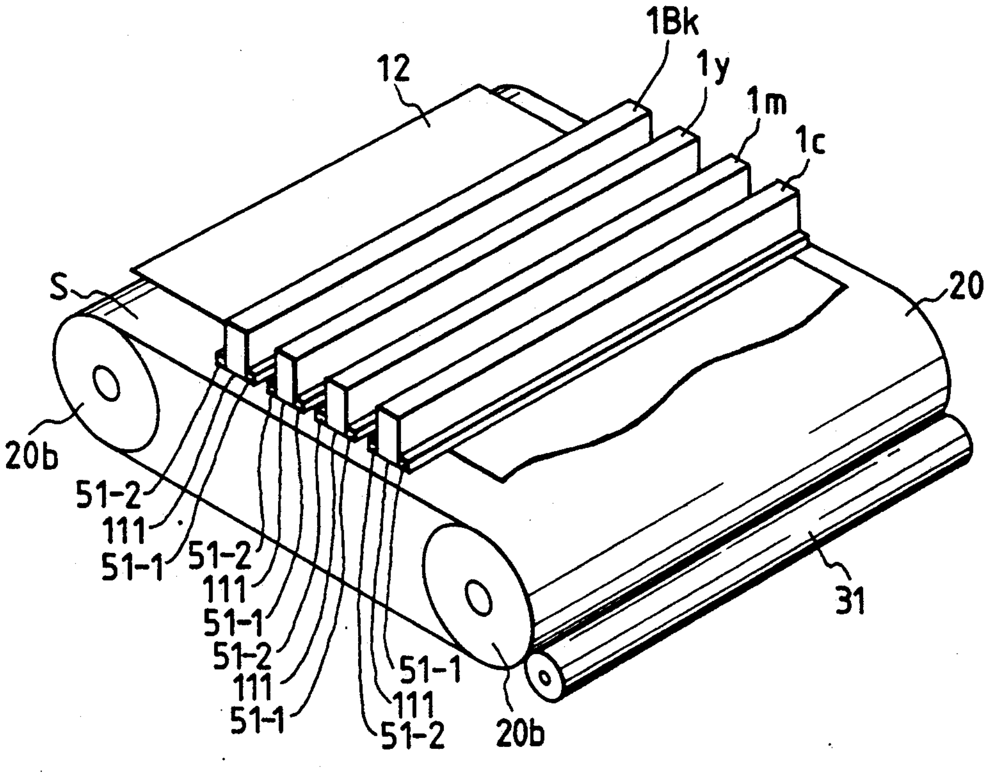
FIG. 6 is a perspective view further showing another embodiment of the present invention.

Also, in the aforesaid embodiment, the electrodes 51-1 and 51-2 are arranged between the discharging port 112 and the recording medium conveyance path S, but the present invention is not limited thereto. For example, it may be possible for the lower ends of the electrodes 51-1 and 51-2 to be arranged on the same plane as the discharging port surface 111 as shown in FIG. 6.

Further, in the present embodiment, although the recording medium is conveyed by the charging attraction with the charged attraction belt, the present invention is not limited thereto. The present invention is also applicable to the system wherein a recording medium is carried by the rollers pitching the recording medium while giving tension thereto or the system wherein a recording medium is carried by the use of air pressure (negative pressure) to suck and hold the recording medium, or the like because in these systems there may be the case where unwanted charged droplets are generated, and with the present invention these unwanted charged droplets can be reliably attracted and removed.

Also, the power source used for the present invention is not limited only to direct current, but also direct current is superimposed with an alternating current.

For example:

| | d.c. portion | a.c. portion |
|---|---|---|
| The first electrode | +700 V | 300 Vp − p 1 kHz |
| The second electrode | −700 V | 300 Vp − p 1 kHz |

(where the alternating current portion is oppositely phased to each other).

Figure 7:
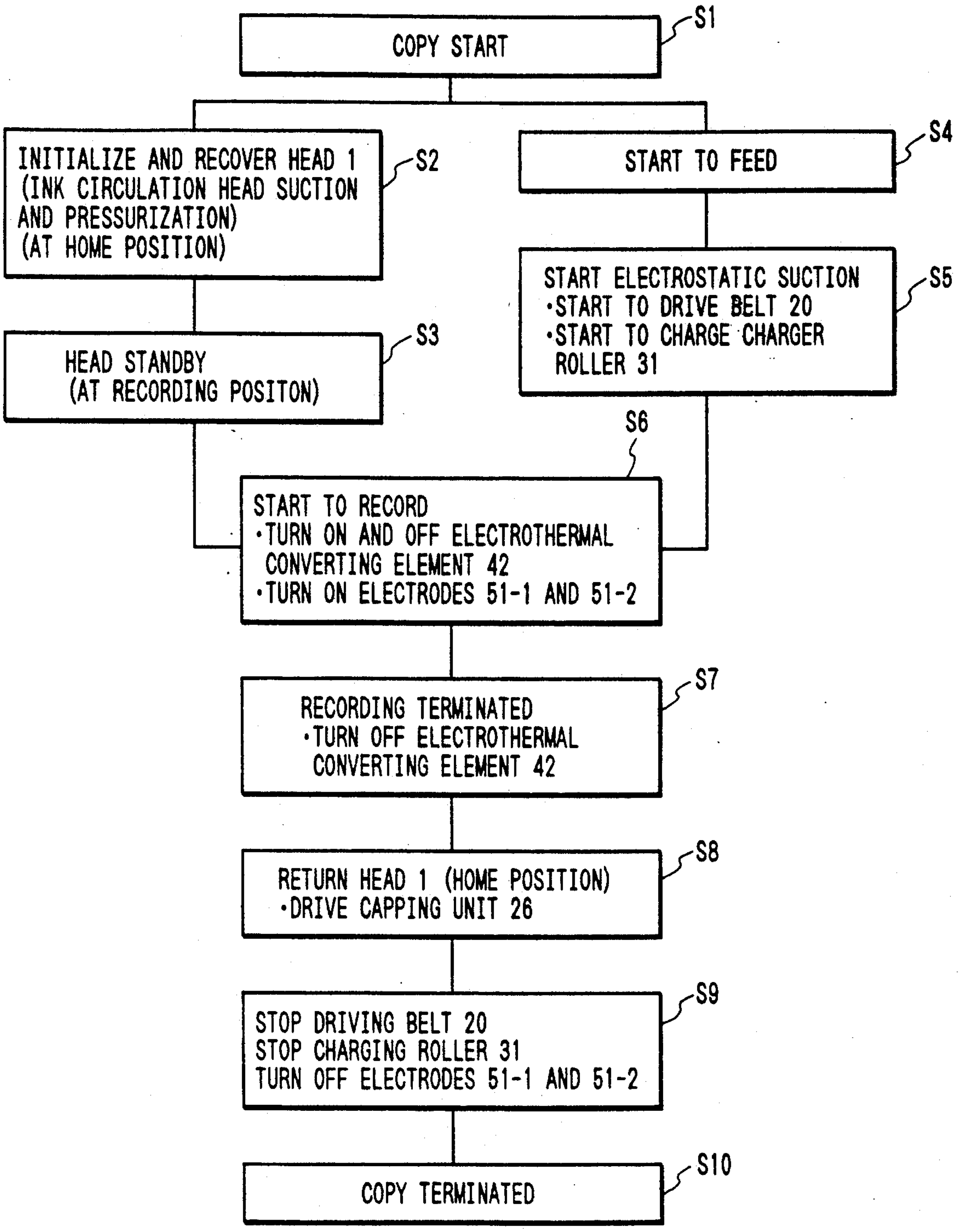
FIG. 7 is a flowchart of an embodiment to which the present invention is applicable.

Now, description will be made of the process flow of the operation of the aforesaid embodiment using the flowchart shown in FIG. 7.

At first, the starting button (not shown) is depressed to start the copying operation at step S1. Next, at step S2, the head 1 (1BK, 1*y*, 1*m*, and 1*c*) is initialized at the home position. For example, the ink circulation by driving a pump, the recovering operation by head suction or compression, and the like are performed. In this respect, these recovering operations are also performed appropriately in the recording process. Subsequently, at the step S3, the head 1 is brought into the standby state at the standby position. On the other hand, at step S4, the feeding of the recording sheet 12 begins. Then, at the step S5, the belt 20 starts to rotate in direction indicated by arrow A and at the same time, the charging by the charging roller 31 begins. At step S6, the recording is started, and the on-off controlling of the electrothermal converter 42 is performed in accordance with recording information. Here in the present embodiment, an example is shown in which at the same time that the recording being started, the electrodes 51-1 and 51-2 are turned on and at the same time of the rotation of the belt 20 is stopped, these electrodes are turned off. However, the on-off controlling of the electrodes 51-1 and 51-2 is not necessarily limited thereto For example, it may be possible to perform such control as shown in FIG. 4, or as described in conjunction with FIG. 8, it may be possible to keep the electrodes to be turned on in about five seconds after the termination of the recording. The control may be selected appropriately. Now, at step S7, when the recording in a predetermined area is terminated, the head 1 is returned to the home position at step S8. Then, the conveying means (not shown) is driven to perform capping of the head 1 with the capping unit 26. Then, at step S9, the driving of the belt 20 is suspended. The charging by the charging roller 31 is also stopped. The electrodes 51-1 and 51-2 are turned off simultaneously. Now, at step S10, the copying operation is terminated.

Figure 8:
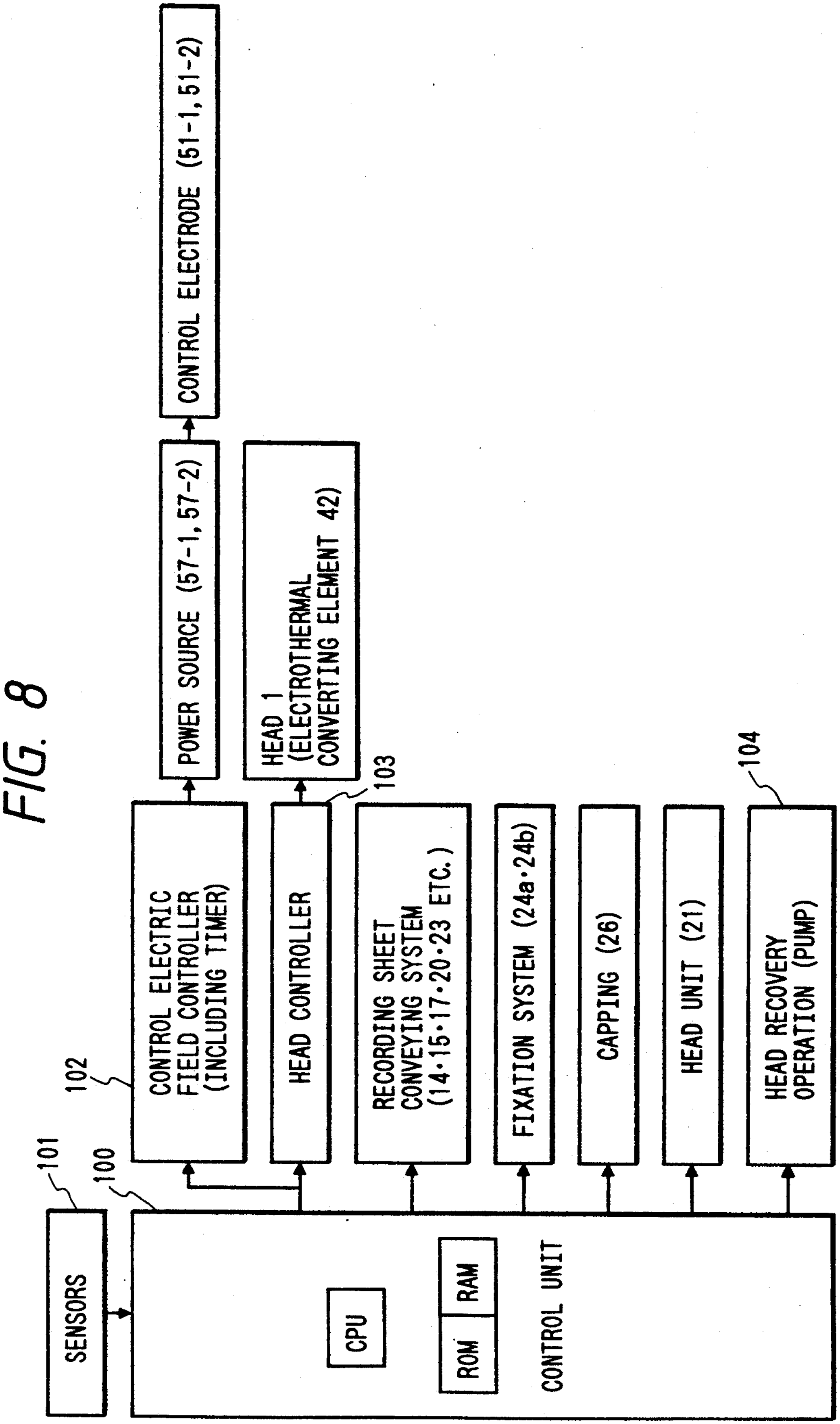
FIG. 8 is a block diagram thereof.
Figures 9A, 9B, 9C:
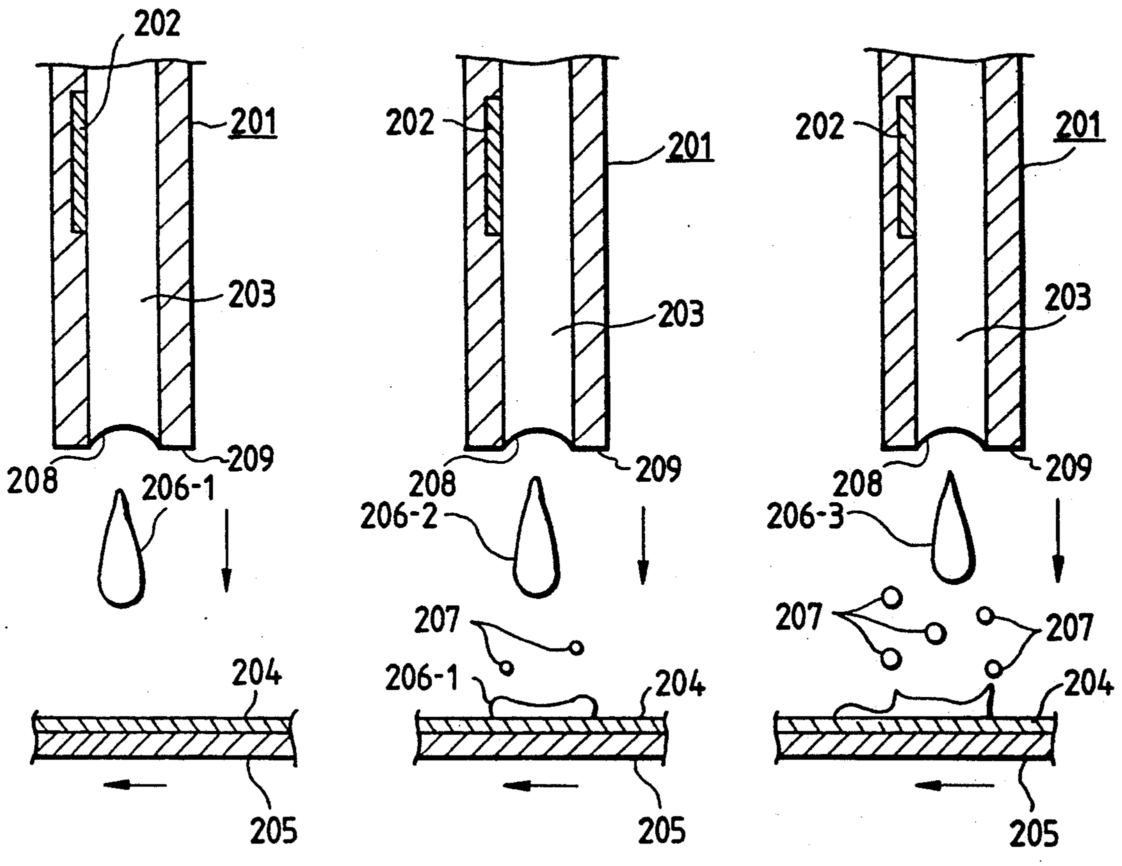
FIGS. 9A through 9C are views respectively illustrating a conventional example.

Now, FIG. 8 is a block diagram showing the embodiment to which the present invention is applicable.

In FIG. 8, a reference numeral 100 designates a control unit for controlling all the systems of the recording apparatus. This controlling unit 100 comprises a CPU which is a microprocessor, or the like, for example, a ROM storing a CPU controlling program such as shown in the flowchart shown in FIG. 7 and various data, and a RAM which functions as a work area for the CPU and at the same time, functions as a tentative storage for various data, and others.

To this controlling unit 100, the signals from the sensor group 101 for detecting the presence of the recording sheet 12, the temperature of the recording head 1, and others are inputted through an input interface portion (not shown).

Also, from this controlling unit 100, various signal are output through an output interface portion (not shown) to execute the controls given below.

At first, the power sources 57-1 and 57-2 are controlled through a controlling electric field controller 102 to turn on and off the controlling electrodes 51-1 and 51-2. In this respect, the controlling electric field controller 102 is provided with a timer so that, for example, the controlling electrodes are kept on for about five seconds subsequent to the termination of the recording to catch reliably the unwanted floating droplets for collection. Also, the on-off control of the electrothermal converter 42 in the recording head 1 (1BK, 1*y*, 1*m*, and 1*c*) is executed through a head controller 103. Likewise, the controlling unit 100 controls through the output interface (not shown) the recording sheet conveyance system (for example, the carrier rollers 14*a* and 14*b*, pick-up roller 15, resisting rollers 14*a* and 14*b* , charged attraction belt 20 (20*b*), discharging rollers 23*a* and 23*b*, and others), fixing system (fan 24*b* and the heater 24*a*), capping unit 26, and head unit 21, or head recovering operation 104 such as ink circulation, head suction, and compression by pump driving, and others.

Each of the aforesaid embodiments enables reliable collection of unwanted droplets such as rebounding mist and satellite droplets by applying voltages of opposite polarities to the first electrode and second electrode provided respectively in the vicinity of the gap between the recording head and recording medium. There is, therefore, an effect to prevent the defective discharging due to the adhesion of the unwanted droplets to the vicinity of the discharging port.

In a system having a conveying means for attracting and holding the recording medium by static electricity for its conveyance, there is an effect, in addition to the above-mentioned effect, to attract reliably the droplets that may adhere to the recording head due to the influence of the electric field generating the aforesaid static electricity.

In this respect, the present invention is efficient in producing an excellent effect on the recording head and recording apparatus of the ink jet recording method, particularly the one using the method for performing the ink jet recording by forming flying droplets by the utilization of the thermal energy.

For the typical structure and principle thereof, it is desirable to adopt for its implementation the fundamental principles disclosed, for example, in the specifications of U.S. Pat. No. 4,723,129 and U.S. Pat. No. 4,740,796. This method is applicable to either so-called on demand type and continuous type recording. Particularly, in the case of the on demand type, at least one driving signal, which gives a recording liquid a rapid temperature rise exceeding the nucleate boiling temperature, is applied in response to the recording information provided for the electrothermal converter arranged with respect to a sheet or liquid path holding a recording liquid (ink) thereby causing the electrothermal converter to generate thermal energy. Hence, film boiling is generated on the thermoactive plane of the recording head, resulting in the formation of a bubble in the recording liquid one to one in response to this driving signal efficiently . The recording liquid is discharged into the atmosphere through the discharging port by the active force generated in the course of the growth and contraction of this bubble to form at least one droplet. It is more desirable to produce this driving signal in the form of pulses. Then, the growth and contraction of the bubble is appropriately performed instantaneously to implement the discharging of recording liquid in a way providing particularly excellent responsivity. For this purpose driving signals such as disclosed in the specifications of U.S. Pat. No. 4,463,359 and U.S. Pat. No. 4,345,262 are suitable. In this respect, if the condition disclosed in the specification of U.S. Pat. No. 4,313,124 concerning the invention as regards the temperature rise on the above-mentioned thermoactive plane, it is possible to perform an excellent recording in a better condition.

For the structure of the recording head, the present invention includes a combination of the discharging port, liquid path, electrothermal converter (linear liquid path or rectangular liquid path) such as is disclosed in each of the above-mentioned specifications as well as the structures having the thermoactive portion arranged in the bent region using the configuration disclosed in the specifications of U.S. Pat. No. 4,558,333 and U.S. Pat. No. 4,459,600.

Further, as to the full-line type recording head having a length corresponding to the maximum width of the recording medium on which the recording apparatus can perform its recording, there may be a structure which attains such length by combining a plurality of recording heads such as disclosed in the, above-mentioned specifications or a structure that attains such length by a single recording head integrally constructed. In either cases, the present invention can display the above-mentioned effects more efficiently .

In addition, the present invention is effectively used with a freely replaceable chip type recording head for which the electrical connection to the main body of the recording apparatus and ink supply become possible when it is installed therein, or a cartridge type recording head having the ink tank integrally provided for the recording head itself.

Also, it is desirable to add a recovery means, preliminary auxiliary means, and the like provided for the recording head as constituents of the recording apparatus of the present invention because with these constituents, the effect of the present invention becomes more stable. To mention them specifically, these constituents can include a capping means for the recording head, cleaning means, compression or suction means, electrothermal converter or thermal element independent thereof or preliminary heating means provided by the combination thereof, and others. Also, it is effective to provide a preliminary discharging mode which performs preliminary discharging besides the recording.

Further, as a recording mode of the recording apparatus, the present invention is extremely effective in a recording apparatus which is provided with the recording head formed integrally or by a combination of a plurality of heads for recoloring with different colors as shown in the aforesaid embodiments or at least one for full-color by mixing colors besides a recording mode for one major color such as black.

In the embodiments of the present invention set forth above, the description has been made of the ink which is a liquid, but it may be possible to use ink which is solidified at room temperature or less if such ink can be liquefied when the signal is given.

Furthermore, as the mode of the ink jet recording apparatus to which the present invention is applicable, there may be those used for copying machines in combination with, readers, and facsimile apparatuses having transmitters and receivers, or the like in addition to the image output terminals for a computer or other information processing apparatuses.

As the above described in detail, according to the present invention, it is possible to provide an ink jet recording apparatus capable of removing the ink mist and other unwanted droplets generated due to recording.

What is claimed is:

1. An ink jet recording apparatus, comprising:

an ink jet head for discharging an ink using an on-demand type system;

conveying means for conveying a recording medium on which said ink discharged from said ink jet head has been deposited to form an image, said conveying means being provided opposite to said ink jet head; and a pair of electrodes provided along an ejection path of said ink between said ink jet heat and said conveying means, wherein said ink is discharged as a droplet during recording and said droplet comprises a relatively large-diametered main droplet which is meant to record and a relatively small-diametered sub-droplet which is not meant to record, and wherein said sub-droplet is electrically charged and floating in said ejection path and at least one of said pair of electrodes attracts said electrically charged sub-droplet.

2. An ink jet recording apparatus according to claim 1, wherein said sub-droplet comprises a satellite ink droplet which has separated from a main droplet when said ink is discharged from said ink jet heat and/or an ink mist caused by rebounding of said ink which has reached said recording medium after said main droplet has been discharged from said ink jet head.

3. An ink jet recording apparatus according to claim 1, wherein said first electrode and said second electrode are installed in a recording unit.

4. An ink jet recording apparatus according to claim 1, wherein said pair of electrodes is electrically charged with opposite polarities and is provided along an array of discharge ports of said ink jet head.

5. An ink jet recording apparatus according to claim 1, wherein said ink jet head is a full-line head having a plurality of discharging ports disposed in a column over an entire width of a recording area, and said pair of electrodes are arranged along the column of said discharging ports over the entire width of said recording area.

6. An ink jet recording apparatus according to claim 1, further comprising:

a conveyer belt for electrostatically attracting an entire face of said recording medium for conveying said recording medium; and charging means for charging said conveyer belt.

7. An ink jet recording apparatus according to claim 1, wherein said ink jet head comprises an electrothermal converter for discharging said ink from a discharging port by utilizing thermal energy generated by said electrothermal converter.

8. An ink jet recording apparatus, comprising:

an ink jet head for discharging an ink using an on-demand type system;

conveying means for conveying a recording medium on which said ink discharged from said ink jet head has been deposited to form an image, said conveying means being provided opposite said ink jet head, said conveying means comprising an electrically-charged belt for electrostatically attracting said recording medium to convey said recording medium and charging means for electrically charging said electrically charged belt; and a pair of electrodes provided along an ejection path of said ink between said ink jet head and said conveying means, wherein said ink is discharged as a droplet during recording and said droplet comprises a relatively large-diametered main droplet which is meant to record and a relatively small-diametered sub-droplet which is not meant to record, and wherein said sub-droplet is electrically charged and floating in said ejection path and at least one of said pair of electrically charged electrodes attracts said electrically charged sub-droplet.

9. An ink jet recording apparatus according to claim 8, wherein said ink jet head is a full-line head having a plurality of discharging ports disposed in a column over an entire width of a recording area, and said pair of electrodes are arranged along the column of said discharging ports over the entire width of said recording area.

10. An ink jet recording apparatus according to claim 8, said ink jet head comprising an electrothermal converter for discharging said ink form a discharging port by utilizing thermal energy generated by said electrothermal converter.

11. An ink jet recording apparatus having a recording head of the on-demand type including a discharge port for discharging an ink droplet to a recording medium, said apparatus comprising:

at least one pair of first and second electrodes provided between said recording head and said recording medium and in the vicinity of said discharge port of said recording head; and a power source for applying voltages of opposite polarities respectively to said first and second electrodes, wherein said ink is discharged during recording as a droplet comprising a droplet which is meant to record and a droplet which is not meant to record, and wherein at least one of said first and second electrodes attracts said droplet not meant to record.

12. An ink jet recording apparatus according to claim 11, further comprising a conveying means for electrostatically attracting and holding said recording medium in order to convey the recording medium to a position facing the recording head.

13. An ink jet recording apparatus according to claim 11, wherein said recording head is a full-line type recording head having a plurality of discharging ports disposed over an entire width of a recording area of the recording medium.

14. An ink jet recording apparatus according to claim 11, wherein said recording head enables the ink to be discharged from a discharging port by utilizing thermal energy, further comprising an electrothermal converter for generating thermal energy.

15. An ink jet recording method for use in a recording apparatus having an ink jet head for recording on a recording medium, comprising the steps of:

providing a pair of electrodes at an area between said ink jet head and said recording medium; and attracting to at least one of said pair of electrodes an electrically charged minute ink droplet which is not required to record, said minute ink droplet having been generated by at least one of discharging a main ink droplet from an on-demand type ink jet head for selectively discharging ink droplets required for recording an impacting of said main ink droplet discharged from said ink jet head onto said recording medium, preventing said minute ink droplet from reaching said recording medium.

16. An ink jet recording method according to claim 15, wherein said pair of electrodes are permanently electrically charged.

17. An ink jet recording method according to claim 15, wherein said pair of electrodes are electrically charged when said minute ink droplet is generated by separating from said main ink droplet after termination of driving of said ink jet head to discharge ink.

18. An ink jet recording method according to claim 15, wherein said pair of electrodes are electrically charged with opposite polarities and are provided along an array of discharge ports of said ink jet head.

* * * * *

UNITED STATES PATENT AND TRADEMARK OFFICE

CERTIFICATE OF CORRECTION

PATENT NO. : 5,298,926

DATED : March 29, 1994

INVENTOR(S) : HISASHI FUKUSHIMA, ET AL.

It is certified that error appears in the above-identified patent and that said Letters Patent is hereby corrected as shown below:

ON TITLE PAGE

In [30] Foreign Application Priority Data, insert:
--Aug. 16, 1991 [JP] Japan ....... 3-205822--.

In [56] References Cited, under U.S. PATENT DOCUMENTS, insert: --3,798,656 3/1974 Lowy et al. .... 346/1.1--.

In [56] References Cited, insert:
-- FOREIGN PATENT DOCUMENTS

| | | |
|---|---|---|
| 2024723 | 1/1980 | Great Britain |
| 0098056 | 1/1984 | European Pat. Off. |
| 0196074 | 10/1986 | European Pat. Off. --. |

COLUMN 1

Line 54, "is" should be deleted.

COLUMN 2

Line 27, "and," should read --and--.
Line 30, "voltage." should read --voltages.--.
Line 60, "the" should be deleted and "having" should be deleted.

COLUMN 3

Line 14, "ink," should read --ink droplet,--.
Line 30, "storing," should read --storing--.

UNITED STATES PATENT AND TRADEMARK OFFICE

CERTIFICATE OF CORRECTION

PATENT NO. : 5,298,926

DATED : March 29, 1994

INVENTOR(S) : HISASHI FUKUSHIMA, ET AL.

It is certified that error appears in the above-identified patent and that said Letters Patent is hereby corrected as shown below:

COLUMN 4

Line 40, "stability" should read --stably--.
Line 63, "means" should read --means are--.

COLUMN 5

Line 4, "quentially," should read --quentially--.
Line 10, "when," should read --when--.
Line 45, "belt, 20 with," should read --belt 20 with--.

COLUMN 6

Line 33, "51 2" should read --51-2--.
Line 36, "over" should read --cover--.
Line 41, "cleaning" should read --cleaning.--.

COLUMN 8

Line 11, "being" should read --is--.
Line 12, "of" (first occurrence) should read --that--.
Line 15, "thereto" should read --thereto.--.
Line 47, "signal" should read --signals--.

COLUMN 10

Line 6, "the," should read --the--.
Line 48, "with," should read --with--.
Line 67, "heat" should read --head--.

COLUMN 11

Line 13, "heat" should read --head--.

UNITED STATES PATENT AND TRADEMARK OFFICE
CERTIFICATE OF CORRECTION

PATENT NO. : 5,298,926

DATED : March 29, 1994

INVENTOR(S) : HISASHI FUKUSHIMA, ET AL.

It is certified that error appears in the above-identified patent and that said Letters Patent is hereby corrected as shown below:

COLUMN 12

Line 7, "form" should read --from--.

Signed and Sealed this

Eighteenth Day of October, 1994

Attest:

BRUCE LEHMAN

Attesting Officer

*Commissioner of Patents and Trademarks*